H. FITZ.
Lens.
No. 44,483.
Patented Sept. 27, 1864.
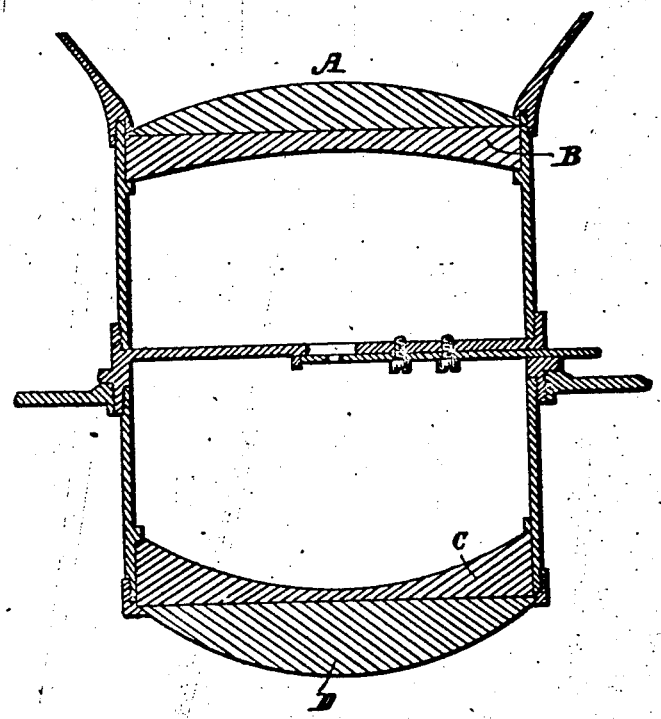
Witnesses:
J. K. Ingalls.
Hannah A. Wells.
Inventor:
Julia A. W. Fitz
Executrix of
Henry Fitz.

UNITED STATES PATENT OFFICE.

JULIA A. W. FITZ, OF NEW YORK, N. Y., ADMINISTRATRIX OF THE ESTATE OF HENRY FITZ, DECEASED.

IMPROVEMENT IN ACHROMATIC LENSES.

Specification forming part of Letters Patent No. 44,483, dated September 27, 1864; antedated September 22, 1864.

*To all whom it may concern:*

Be it known that HENRY FITZ, of New York, in the county of New York, in the State of New York, lately deceased, did invent an improved method of constructing Lenses for Photographic and Optical Instruments, Cameras, &c.; and I, JULIA A. W. FITZ, executrix of the said HENRY FITZ, do hereby declare that the following is a full and exact description thereof, reference being had to the accompanying drawing and to the letters of reference marked thereon. Said drawing shows a section of the lenses as corrected and arranged for use in a camera-tube, and in which—

A is the exterior front plano-convex lens of crown glass. B is the interior front plano-concave lens of flint glass. C is the interior back plano-concave lens of flint glass, and D is the exterior back plano-convex lens of crown glass.

The nature of said invention consists in making the corrections for achromatic and spherical aberrations by employing lenses with the outer surfaces so curved and combined as to admit of the use of plane surfaces in the place of what are technically termed "the interior correcting curves," and by making the interior surfaces plane.

To enable others skilled in the art to make and use the said invention, I will proceed to describe its construction and operation.

The lenses are made and arranged as shown in the drawing—that is to say, the front lens (or lens toward the object) is composed of a plano-convex lens, A, of crown glass, of any required power or size, and is corrected by a plano-concave lens, B, of flint glass, the curve for the concave lens being more flat than the curve of the convex lens. The back or inner lens is composed of a plano-convex lens, D, of crown glass, of greater convexity than A, and of a plano-concave lens, C, of flint glass, more concave than B. These lenses being properly cemented on their plane surfaces, and arranged as shown, are employed in a camera in the usual manner for copying or taking landscapes, or they are arranged for use in microscopes or other optical instruments.

Heretofore all achromatic instruments have been made with concave and convex surfaces, matched and cemented together, or with what is known to the art as "interior correcting curves," whereas by the above invention the interior or cemented surfaces are plane, and can be made at a greatly reduced expense. By this arrangement, also, all the advantages of short focal length, large and flat field, and freedom from distortion, claimed for the spherical or globular lens, are attained with greater facility and cheapness than by that instrument. The sperical aberrations are thoroughly corrected, and the defect called "the ghost" is completely dispelled.

What I claim as the above invention, and desire to secure by Letters Patent, is—

The method of correcting spherical and achromatic aberrations and curvatures of field in cameras for taking photographic views and for the various optical instruments, substantially as specified and set forth.

JULIA A. W. FITZ,

*Executrix to the estate of Henry Fitz.*

In presence of—
J. K. INGALLS,
HANNAH A. WELLS.